United States Patent Office 3,386,623
Patented June 4, 1968

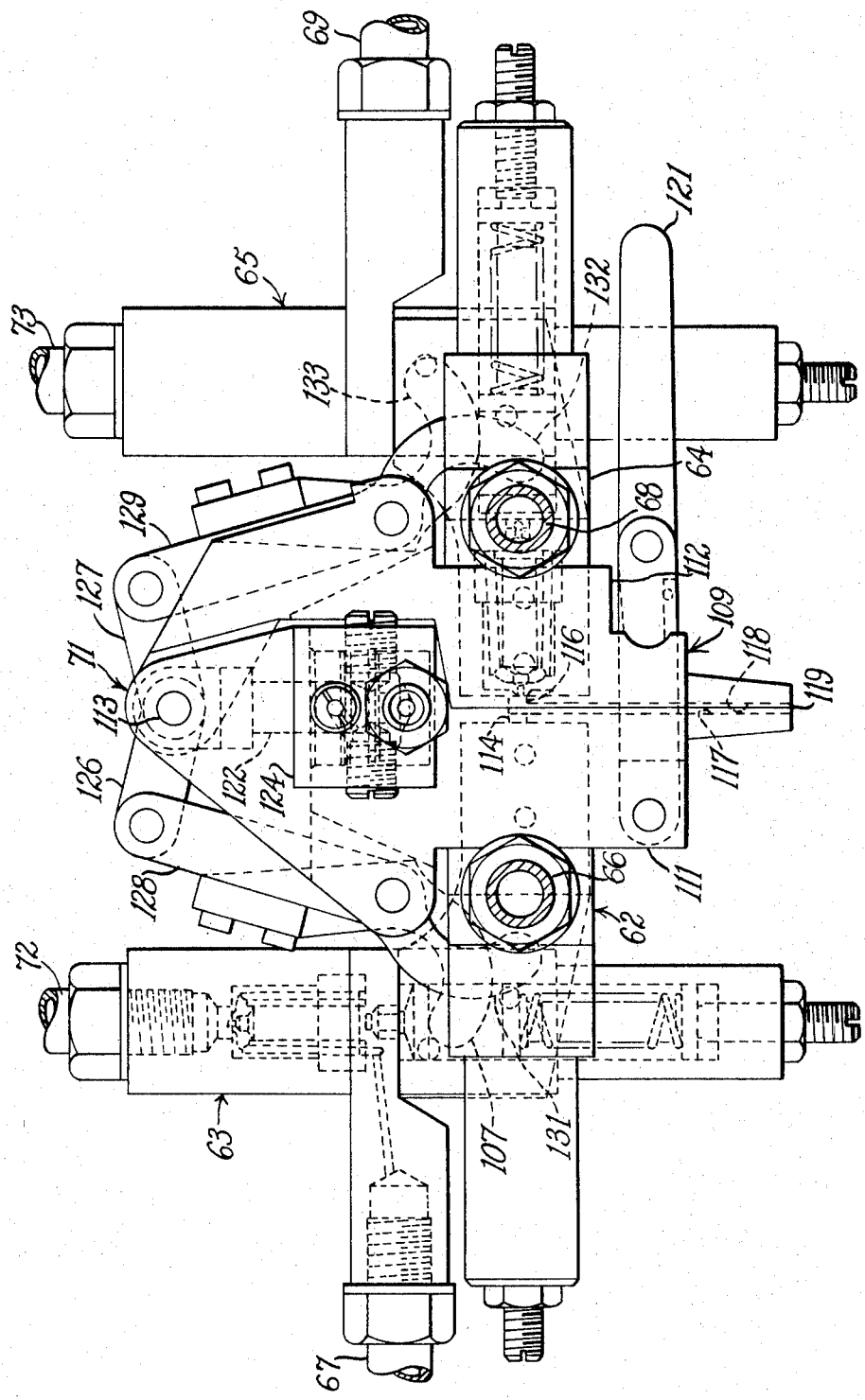

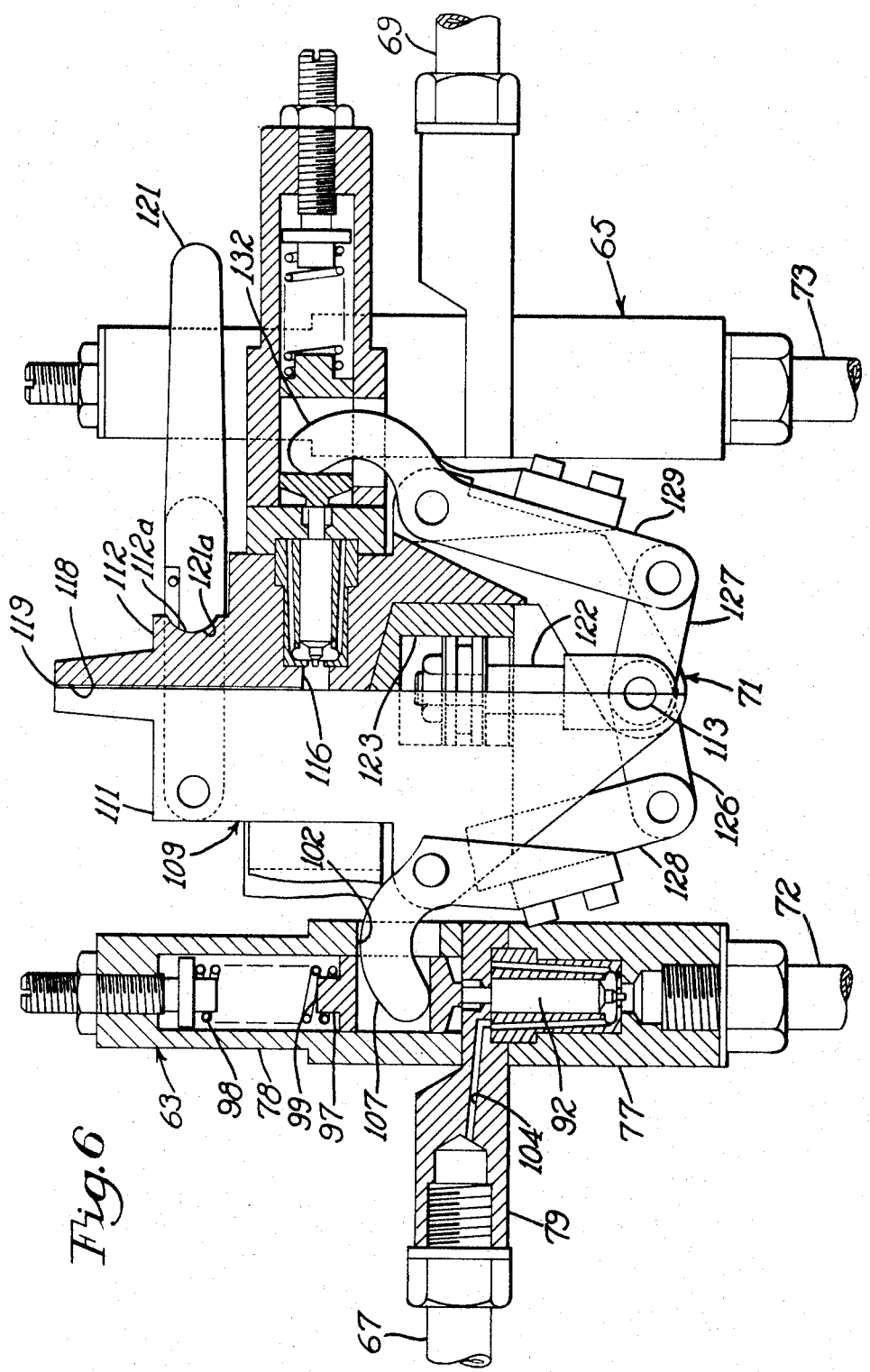

3,386,623
MIXING AND DISPENSING APPARATUS
William H. Berrill and Eric Blower, Leicester, England, assignors to United Shoe Machinery Corporation, Boston, Mass., a corporation of New Jersey
Filed Jan. 20, 1967, Ser. No. 610,588
Claims priority, application Great Britain, Feb. 5, 1966, 5,137/66
10 Claims. (Cl. 222—134)

ABSTRACT OF THE DISCLOSURE

A device for feeding the components of a composition in a predetermined adjustable ratio to a mixing chamber, mixing the components in a predetermined ratio, and dispensing the composition from a discharge orifice. The disclosed apparatus generally comprises a means for storing the components, a dispensing mechanism and first and second feeding means for feeding the components to the dispensing mechanism, the dispensing mechanism being movable from a first condition in which the components fed thereto are fed to the mixing chamber and dispensed therefrom, and a second condition in which the components are recirculated through the feeding means.

Background of the invention

The present invention relates to a mixing and dispensing apparatus and more particularly to a device for mixing reactive components in a specific ratio prior to the dispensing thereof.

In certain manufacturing processes it is frequently required that a continuous flow of a mixture of two or more materials be provided. For example, in certain continuous cementing processes a cement composition is provided by the mixing of two or more constituent materials, one material of which will be an activator. In such processes the mixing of the constituent materials preferably takes place just prior to the application of the cement composition to a work piece.

Presently available devices for mixing two or more constituent materials in a continuous process, and dispensing the mixture through a discharge orifice or the like, have generally proved satisfactory. Frequently such devices do not provide accurate apportionment of the mixtures, particularly during initial stages of dispensing the mixture. Likewise, many machines of this type have poor, or completely lack, facilities for readily changing the ratio in which the constituent materials are mixed.

Summary of the invention

It is therefore a general object of the present invention to provide an improved apparatus adapted for use in dispensing a composition provided by mixing, in a predetermined ratio, a plurality of constituent materials.

Another object of the invention is to provide a mixing and dispensing apparatus of the type set forth which provides increased accuracy in apportionment of the constituent components during initial stages of dispensing the mixture.

A further object of the present invention is to facilitate changing the ratio of constituent materials to be provided in a combined mixer-dispenser.

These objects of the invention as well as other objects which will be apparent as the description proceeds are effected by providing apparatus as hereinafter described.

The illustrative apparatus is adapted for use in dispensing in a predetermined adjustable ratio, a mixture of polyester composition and polyisocyanate composition from an orifice. The apparatus generally comprises a storage device in which the constituent materials are stored, a dispensing mechanism, and a feeding mechanism having first and second feeding means to feed the polyester and the isocyanate composition respectively from the storage device to the dispensing mechanism. The dispensing mechanism is movable between a first condition in which the materials which are fed thereto are fed to a mixing chamber of the feeding mechanism from where they are dispensed through a discharge orifice, and a second condition in which the mixtures are not so fed and mixed but are recirculated. The dispensing mechanism is generally moved between these two conditions by suitable control mechanism as described in the illustrative apparatus.

Details of the apparatus to be described include a storage device which comprises a first tank in which isocyanate composition is maintained under pressure. A feed conduit extends from this first tank to an upper portion of a first cylinder of the feeding mechanism and pressure within the tank urges flow of isocyanate composition past a one-way valve into the cylinder to urge a piston in the cylinder downwardly. This first cylinder and piston provide a first feed means of the feeding device. A supply conduit extends from the feed conduit between the cylinder and the one-way valve, to the dispensing mechanism.

Additionally the storage device of the illustrative apparatus comprises a second tank in which polyester composition is maintained under pressure, a feed conduit extending from the second tank to an upper portion of a second cylinder of the feeding mechanism which also has a piston disposed therein. This second cylinder and its piston provide a second feeding means, and a supply conduit extends to the dispensing mechanism from a point in the feed conduit located between the second cylinder and a one-way valve disposed in the conduit.

The feeding mechanism also includes operating means comprising a master cylinder having its piston movable by a hydraulic controlled device. A rod connected to the piston extends along side piston rods of the first and second cylinders, the three piston rods being connected to a link member of a correlating means of the feeding mechanism. The position at which the piston rod of one of the first and second cylinders is secured to the link member is adjustable relative to the piston rod of the master cylinder such that relative rates of operation of the two feeding means may be varied. The link member is pivotally mounted at one end portion, therefore, movement of the piston rod is dependent on movement of the link member.

On operation of the hydraulic control device to move the master cylinder piston upwardly, the pistons within the first and second cylinders are moved upwardly in a ratio dependent on this position at which their rods are secured to the link member. Thus feeding of isocyanate and polyester compositions from within the cylinders along the feed conduits to the dispensing mechanism is accomplished in a predetermined ratio.

Each supply conduit has extending therefrom a discharge valve and a return valve of the dispensing mechanism. The two discharge valves extend to a discharge conduit, while each return valve extends to a return conduit leading back to the storage tank. In the first condition of the dispensing mechanism the discharge valves are open while the return valves are in the closed position. Conversely, in the second condition thereof, the discharge valves are closed while the return valves are maintained in the open position.

The operation of the illustrative device is effective to achieve the objects of the invention in that the dispensing mechanism is left in its second condition and the two materials are returned to their respective tanks until steady flow of both polyester and isocyanate compositions along the two supply conduits has been achieved. However, when steady flow has been achieved, the dispensing mechanism is moved to its first condition and the two materials flow in the desired ratio to the discharge conduit to be mixed therein, and to flow from the orifice.

While in the illustrative apparatus as hereinbefore described generally, and as will be hereinafter described in detail, the materials are depicted as being a polyester composition and a polyisocyanate matreial, it should here be emphasized that the apparatus is not limited to these materials and is equally effective in dispensing other materials which are to be mixed and dispensed in continuous process.

For a better understanding of the invention, reference should be had to the accompanying drawings, wherein:

FIG. 5 is a top plan view taken along the line V—V of FIG. 3 showing details of the dispensing mechanism taken on an enlarged scale; and FIG. 6 is a bottom plan view partially in section taken along the lines VI—VI of FIG. 3 and showing details of the various elements of the dispensing mechanism, likewise taken on an enlarged scale similar to that of FIG. 5.

Figure 1:
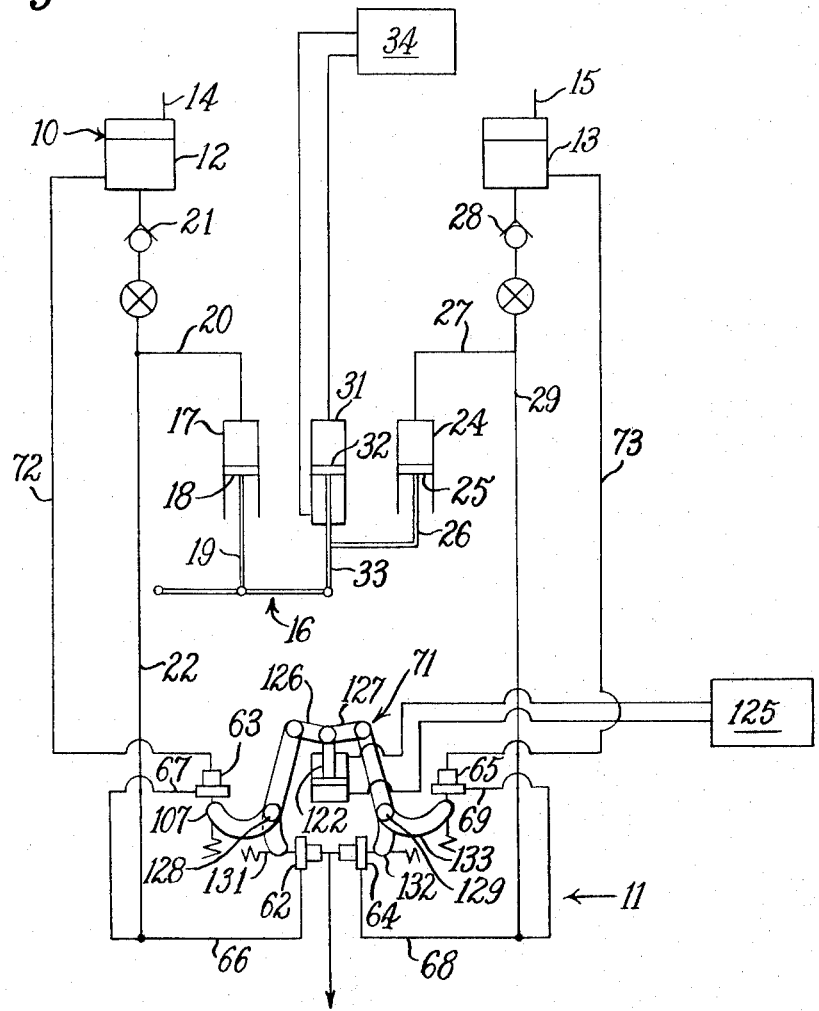
FIG. 1 is a schematic view showing the various elements of the illustrative dispensing apparatus.
Figure 2:
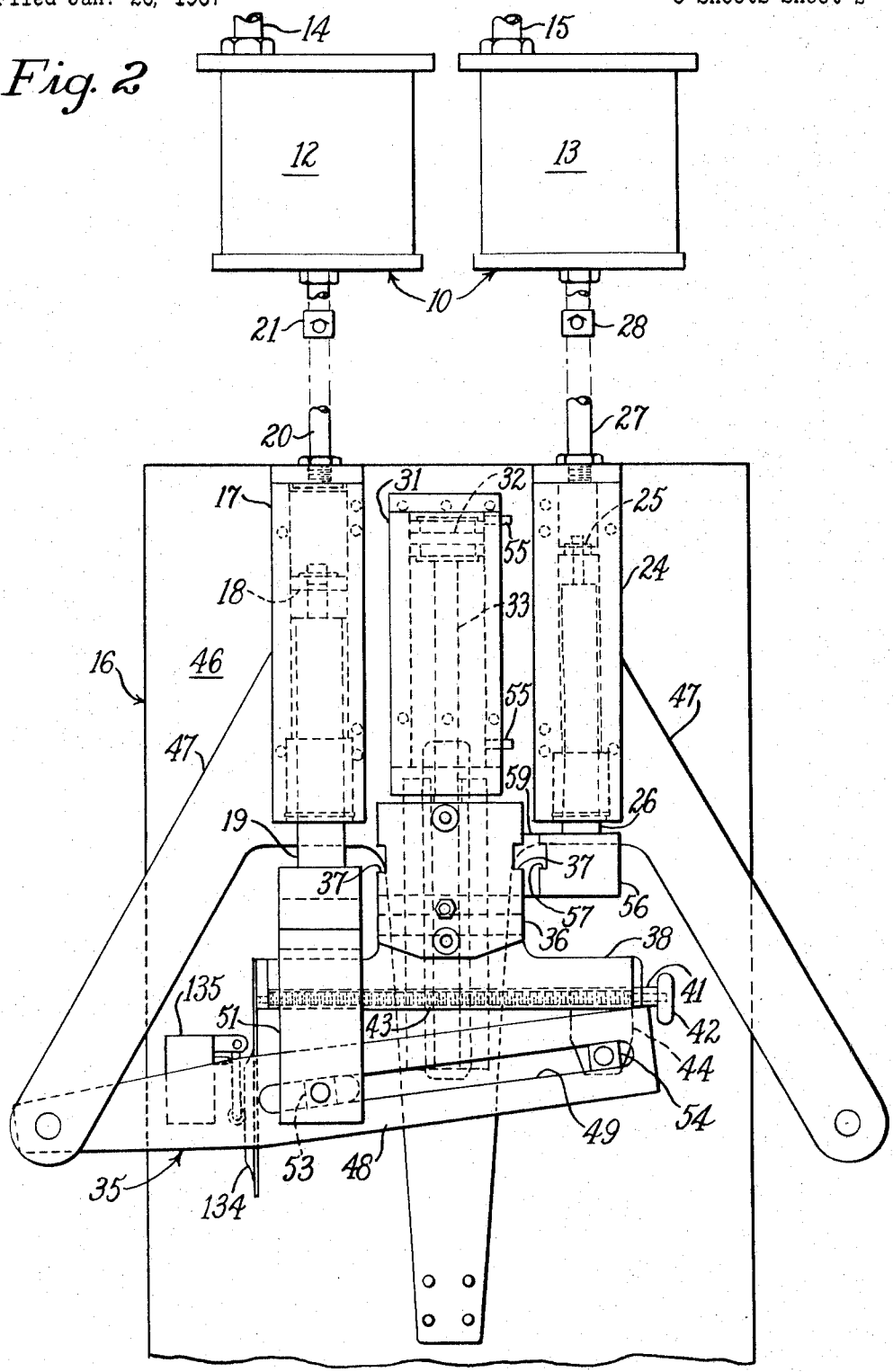
FIG. 2 is a fragmentary elevational view showing the feeding device and correlating means of the illustrative apparatus of FIG. 1.
Figure 3:
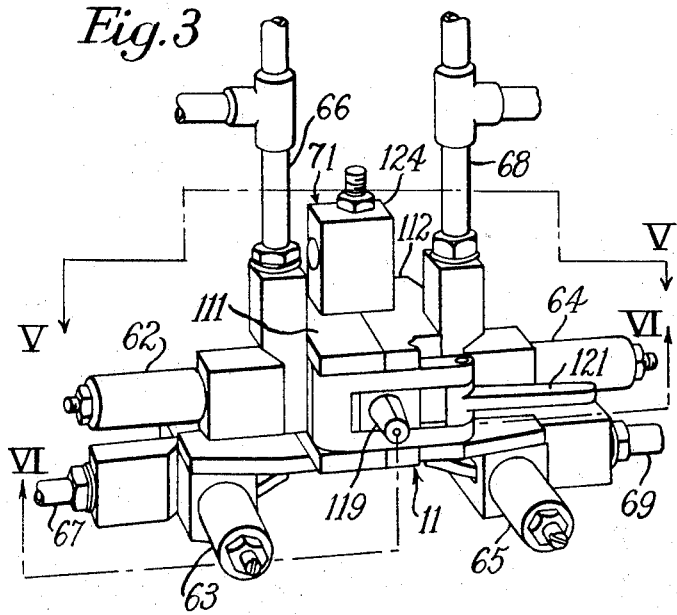
FIG. 3 is a perspective view showing the dispensing mechanism of the apparatus of FIG. 1.

Referring now to the drawings, especially FIGS. 1 and 2, there is shown apparatus adapted for use in dispensing a mixture of polyester and polyisocyanate composition which generally comprises a storage device 10 and dispensing mechanism 11 (FIG. 3) connected through feeding mechanism 16 adapted to feed the two constituent materials from the storage device to the dispensing mechanism.

The storage device 10 comprises first and second tanks 12 and 13 in which are maintained a store of isocyanate composition and polyester composition respectively. Air pipes 14 and 15 extend to upper portions of the tanks and are pressurized to exert a pressure in excess of atmospheric on the two compositions.

The feeding mechanism 16 comprises feeding means adapted to feed isocyanate compositions, which includes a cylinder 17 having a piston 18 slidably mounted therein to which is attached a piston rod 19. A feed conduit 20 extends between a lower portion of the tank 12 and an upper portion of the cylinder 17, and a one-way valve 21 is located within this conduit permitting flow of isocyanate composition only from the tank 12 to its cylinder 17. A supply conduit 22 extends from a point in the feed conduit 20 between the valve 21 and the cylinder 17, to the dispensing mechanism 11. The mechanism 16 also comprises a second feeding means adapted to feed polyester composition which is provided by a second cylinder 24 having a piston 25 slidably mounted therein, to which is attached a piston rod 26. As will be noted, the lower portion of the two cylinders 17 and 24 are open to the atmosphere. A feed conduit 27 extends between a lower portion of the tank 13 and an upper portion of the cylinder 24, and a one-way valve 28 is positioned in this conduit permitting flow of polyester composition from the tank 13 towards the cylinder 24, only. A supply conduit 29 extends from the feed conduit 27, at a point between the valve 28 and the cylinder 24, to the dispensing mechanism 11.

The feeding mechanism 16 also comprises operating means provided by a master cylinder 31 having a piston 32 slidably mounted in the cylinder and connected to a piston rod 33, and a hydraulic control device 34 by which movement of the piston within the master cylinder is controlled. The control device 34 will not be further described as it may be chosen from any device well known in the art for applying fluid pressure to the cylinder 31, the details of such device not being essential for an understanding of the present invention.

As will be noted from FIG. 2 the feeding mechanism 16 further comprises correlating means 35 whereby, on operation of the control device 34 to move the piston 32 in the cylinder 31, the two pistons 18 and 25 of the first and second feeding means move within their cylinders 17 and 24 respectively. The correlating means 35 which will be hereinafter described in detail, is adjustable to vary the rate at which the two pistons 18 and 25 move relative to one-another to fed the two constituent materials to the dispensing mechanism, on movement of the piston 32. By varying the adjustment of the correlatnig means 35, the resultant composition of the mixture dispensed is varied.

The correlating means 35 is shown to have a head piece 36 secured to the piston rod 33 of the master cylinder 31 which is provided with two oppositely facing recesses 37. A block 38 is secured to the head piece 36 by a pin, the block being provided with an axial bore 39 which extends generally transversely to the piston rod 33. Mounted within this bore 39 is a threaded shaft 41 which is provided at one end portion with a handle 42 whereby the shaft may be rotated.

The block 38 is further provided with a slot 43 extending through to the bore 39, which slot 43 extends adjacent the shaft 41. Extending through this slot into the bore 39 is a slide 44 provided with a central threaded bore in which the shaft 41 is engaged. On rotation of the handle 42 the slide 44 moves along the length of the block 38 as best shown in FIG. 2.

Referring still to FIG. 2, it will be observed that the feeding mechanism 16 further comprises a framework 46 having a pair of arms 47 projecting therefrom. On the left arm 47 is disposed a link member 48 provided with a slot 49. The rod 19 of the first feeding means is connected by a bracket 51 to a block 53 slidably mounted within the slot 49. A block 54 mounted within a right-hand end portion of the slot 49 is secured to the slide 44 and the position of this block within the slot is adjusted through movement of the slide 44 on the shaft 41 through turning of the handle 42.

A lower end portion of the rod 26 of the second feeding means has a block 56 connected thereto which block is provided with a recess 57 facing the recess 37 of the head piece 36. A T-piece 59 is adapted to fit into the two recesses 57 and 37, whereby the piston 25 is moved within the second cylinder 24 on movement of the piston 32 within the master cylinder 31.

Operation of the control device 34 is effective to admit fluid to the cylinder 31 through either of a pair of ports 55, causing movement of the piston 32. As the piston 32 travels in its cylinder 31, the piston 25 moves within the second cylinder 24, and the link member 48 is moved about its pivot by an amount dependent upon the position of the block 54 within the slot 49. The position of the block 54, as previously described may be varied by operation of the handle 42. This arcuate movement of the member 48 moves the block 53 which is secured by the bracket 51 to the rod 19, which is in turn effective to move the piston 18 within the first cylinder 17.

Referring now to FIGS. 3–6 the dispensing mechanism 11 comprises four valves, a first discharge valve 62, a first return valve 63 and a second discharge valve 64 and a second return valve 65, which valves are similar to valves most commonly used for fuel injection. The supply conduit 22 is connected to a pair of inlet conduits 66 and 67 of the valves 62 and 63 respectively, and the supply conduit 29 is connected to inlet conduits 68 and 69 of the valves 64 and 65 respectively.

In the first condition of the dispensing mechanism 11 the valves 62 and 64 are maintained by control mechanism (FIGS. 5 and 6) in open conditions allowing the constituent materials to flow through the valves 62 and 64 to be dispensed from the mechanism. In the second condition of the dispensing mechanism 11, the valves 62 and 64 are held by a control mechanism 71 in closed conditions, the valves 63 and 65 being maintained in open conditions to feed the constituent materials along a pair of return conduits 72 and 73 back to their respective tanks 12 and 13, as perhaps best shown in FIG. 1.

As the four valves 62, 63, 64 and 65 are similar, only the valve 63 will be herein described in detail. However, it will be appreciated that, whereas these valves are similar in principle of operation there may be small constructional differences made enabling them to be secured conveniently together.

Figure 4:
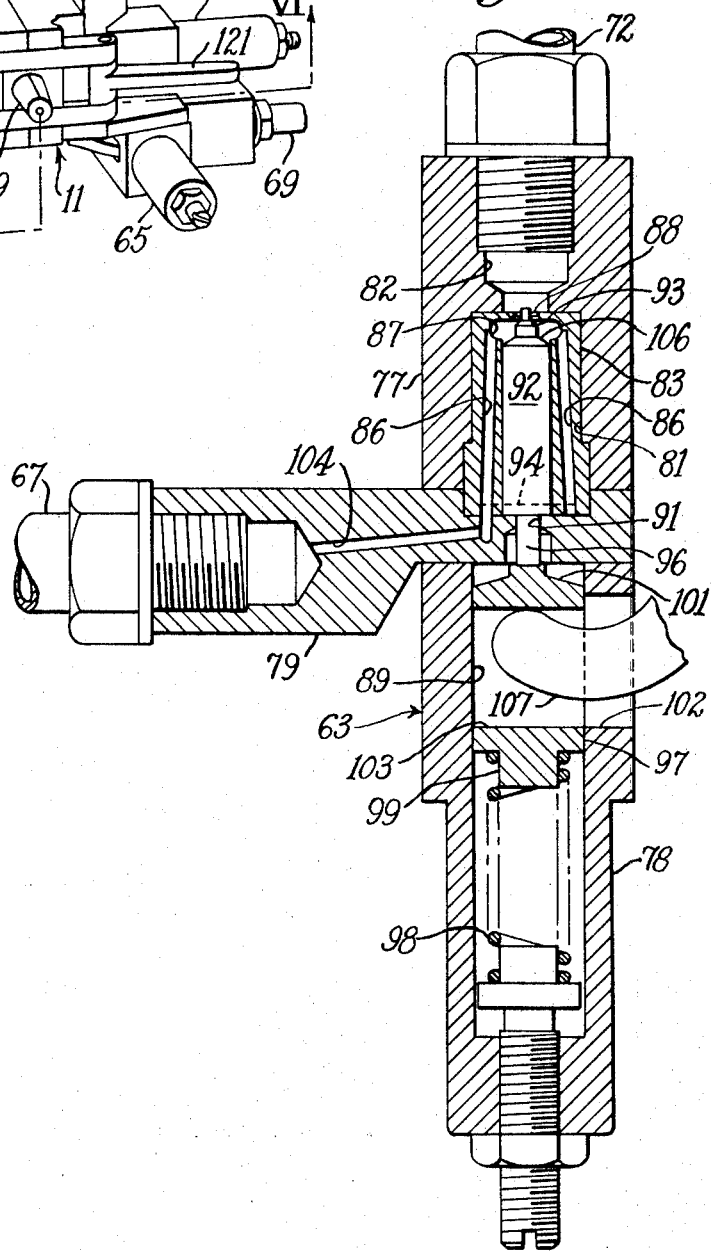
FIG. 4 is a sectional view showing a valve of the dispensing mechanism of FIG. 3 taken on an enlarged scale for clarity.

As best shown in FIGS. 4 through 6 the valve 63 comprises an upper body assembly 77, a lower body assembly 78 and an inlet assembly 79 secured together by bolts. The assembly 77 is provided with an axial bore 81 connected to an outlet passage 82 thereof. A sleeve 83 is secured within the bore 81 and is provided with a lower, annular groove from which two passages 86 extend through the sleeve to an upper portion thereof. An upper portion of the sleeve 83 is recessed thereby providing a chamber 87. In addition, a lip on an upper portion of the sleeve 83 provides a restriction 88 between the chamber 87 and the outlet passage 82, and a lower portion of the sleeve is seated on the inlet assembly 79. The assembly 78 is further provided with an axial bore 89 in alinement with the bore 81, and an orifice 91 in the outlet assembly 79 is effective to provide a restriction between the bores 81 and 89.

Slidably located within the sleeve 83 is a valve member 92 having an upper end portion 93 disposed in the chamber 87. A lower end portion 94 of the member 92 is seated on an upwardly facing surface of the assembly 79, and a plunger 96 of the member 92 extends through the orifice 91 into the bore 89 of the assembly 78. Slidably disposed within the bore 89 is a plunger member 97, urged upwardly by a compression spring 98 which is located within a lower portion of the bore 89 and in engagement with a lower portion 99 of the member 97.

An upper end portion 101 of the member 97 engages the plunger 96, urging the valve member 92 upwardly and the portion 93 thereof into the restriction 88, between the bore 81 and the outlet passage 82.

A slot 102 is provided in the lower body assembly extending into the bore 89 thereof, and this slot is alined with the slot 103 in the plunger member 97.

In employing the valve 6, constituent material is fed under pressure through the inlet conduit 67 and flows through passages 104 of the inlet assembly 79 to the annular groove of the sleeve 83, and thence along the passages 86 to the chamber 87.

Pressure of the constituent material on a sloping shoulder 106 of the valve member 92 is such that the member is urged downwardly as shown in FIG. 4, with the portion 93 moving from within the restriction 88 and the plunger 96 urging the member 97 downwardly against the action of the spring 98. The valve 63 is moved from its open to its closed condition by an operating member 107 which is moved upwardly by the control mechanism 71 (which will be described in further detail hereinafter). As will be observed in the drawings, movement of the member 107 upwardly as shown in FIG. 4, is effective to move the plunger member 97 and the valve member 92 upwardly and to move the upper end portion 93 of the member 92 to a position closing the restriction 88 and thereby preventing flow of constituent material to the outlet passage 82 and along the conduit 72 to the tank 12.

Referring now to FIGS. 5 and 6 the dispensing mechanism 60 is shown to have a head assembly 109 comprising a first block 111 and a second block 112 pivotally secured together by a pin 113.

Each of the blocks 111 and 112 is provided with a recess into which the valves 62 and 64 are secured, and extending from within the recess are a pair of passages 114 and 116 respectively. In a closed condition of the head assembly 109 these two passages 114 and 116 provide outlet conduits extending from the outlet orifices of the two valves 62 and 64. These orifices are similar to the passage through the restriction 88 of the valve 63 as previously described.

The two passages 114, 116 extend to a pair of cooperating groves 117 and 118 which are provided in inner surfaces of the two blocks 111 and 112 respectively. In the closed condition of the assembly 109, these two grooves 117 and 118 provide both a mixing chamber and a discharge conduit extending to a discharge orifice 119. As best shown in FIGS. 5 and 6 taken together with FIG. 3, the two blocks 111 and 112 are moved relatively about the pivot pin 113 between the closed and the open condition of the head assembly 109 by an over-center operating lever 121. The lever 121 has a cam surface 121a which is forced into an annular groove 112a of the block 112 to hold the blocks 112 and 113 together. In the open condition the blocks 111 and 112 are separated and the passages 114 and 116 and the grooves 117 and 118, are exposed and may thereby be conveniently cleaned.

The control mechanism 71 of the dispensing mechanism 11 comprises a plunger 122 movable within a cyclinder 123 of a block 124. The plunger 122 is moved by fluid pressure which may be provided by a suitable operating mechanism 125 (FIG. 1) capable of pressurizing the cylinder 123. The operating mechanism 105 may be any one of a number of pressure devices well known in the art and as such will not be herein described as such description is not necessary for the understanding of the present invention.

The plunger 122 is pivotally secured to first and second link members 126 and 127 which members are pivotally secured at opposite end portions thereof to first and second composite operating arms 128 and 129.

The arm 128 is provided with the operative member 107 which extends through the slot 102 in the lower body assembly 78 of the valve 63, and through the slot 103 in the plunger 96 as previously described with regard to FIG. 4. Likewise a second operative member 131 (FIG. 1) extends through a similar slot in the lower body assembly of the valve 62 and through a slot in a similar plunger member thereof. It should be further understood that the arm 129 is provided with similar members 132 and 133 for operating the valves 64 and 65 respectively.

To operate the illustrative device the tanks 12 and 13 are filled with isocyanate and polyester composition respectively and the control device 34 is energized to lower the piston 32 of the master cylinder 31 by admitting fluid under pressure to the upper port 55. With the lowering of the piston rod 33, the link member 48 of the correlating means is also lowered resulting in the pistons 18 and 25 of the first and second cylinders lowering and the constituent materials flowing along the conduits 20 and 27 into the cylinders 17 and 24 respectively.

On completion of the filling of these two cylinders 17 and 24 movement of the piston 32 of the master cylinder 31 is reversed causing flow of isocyanate composition and polyester composition along the conduits 22 and 29 respectively.

The dispensing mechanism 11 is at this time in its second condition, with the operating mechanism 125 providing fluid pressure to the control mechanism 71 with the plunger 122 in an upper position and the operating members 131 and 132 holding the valves 62 and 64 in their closed conditions, as best shown in FIGS. 5 and 6.

Pressure of flow of the materials results in material flow through these valves, through the return conduits 72 and 73 respectively, and back to the tanks 12 and 13.

When the flow of materials (which are in proportions dependent on the adjustment handle 42) has reached a steady state, the operating mechanism 125 is activated to move the dispensing mechanism 11 to its first condition. The plunger 122 is then caused to move downwardly, the operating members 107 and 133 move to close the valves 63 and 65, and simultaneously the members 131 and 132 releases the valves 62 and 64 which are then opened by the feeding pressure of the constituent materials.

The isocyanate and polyester compositions flow along the pasages 114, 116 respectively and then flow together along the passage provided by the grooves 117 and 118 wherein they are mixed, the mixture flowing from the discharge orifice 119.

Referring back to FIG. 2, on nearing the limit of possible upward movement of the pistons within their cylinders, a contact member 134 secured to the block 38 releases a microswitch 135 which is connected to the mechanism 125 and operates the mechanism 11 to move the dispensing mechanism 11 to its second condition. The switch 135 is connected also to the control device 34 and operates the device to stop movement of the piston 32 of the master cylinder 31. The process as described is then repeated.

A difficulty which is generally inherent in such component recirculating systems as heretofore described, arises from the tendency for a surge in flow of constituent materials to develop on switching from the recirculating condition to the feed condition. This surge is usually caused by a difference in the flow resistances encountered by each of the materials on traveling along different paths. Due to differing viscosities of the materials, the flow surges are unlikely to be equal and therefore, the initial mixture dispensed from the mechanism 11 would be of an unsuitable ratio of components.

The present device, however, has successfully overcome this difficulty by making the flow resistance in the feed paths to the valves substantially equal to the flow resistance in the recirculation paths to the valves for each of the constituent materials. Thus, the combined length of the lines 22 and 66 is made substantially equal to the combined length of the lines 22 and 67, and the combined length of the lines 29 and 68 is substantially equal to the combined length of the lines 29 and 69. This arrangement, together with the simultaneous operation of the valves 62 and 63, and the valves 64 and 65, is effective to equalize flow resistance during recirculation and feeding of the materials by minimizing the described flow surge.

In the previous description, operation of the handle 42 to move the slide 48 within the slot 43 has been shown effective to provide a change of the proportions in which the constituent materials are mixed. However, the illustrative device is provided with further means for adjusting these proportions.

Referring again to FIG. 2, it will be noted that the block 56 of the piston rod 26, and the block 51 of the piston rod 19 may readily be interchanged. To effect this change, the T-piece 59 is removed from within the right-hand recess 37 and inserted, in cooperation with the recess 57 of the block 56, into the left-hand recess 37. The link member 48 is then reversed with the block 38 and pivotally mounted on the right-hand arm 47 of the framework 46.

This exchange, together with providing of different sized cylinders 17 and 24, furnishes a considerable degree of adjustment of the ratio in which the two materials are mixed and is effective to facilitate such adjustment.

It will be appreciated that whereas the illustrative device is adapted to dispense a composition provided by mixing together two constituent materials, this invention may readily be used to provide a device adapted to dispense a composition provided by mixing together three, or even more, constituent materials.

Having thus described our invention, what we claim as new and desire to secure by Letters Patent of the United States is:

1. Apparatus adapted for use in dispensing a composition provided by mixing together a plurality of constituent materials and comprising, a device for storage of the constituent materials, a dispensing mechanism having a mixing chamber and discharge means, means interconnected between said storage device and said dispensing mechanism for feeding constituent material from said storage device to said dispensing mechanism, and conduit means providing flow paths for a constituent material between said storage device, said feeding means and said dispensing mechanism, said dispensing mechanism being movable between a first condition wherein a constituent material is fed to said mixing chamber and dispensed from said discharge means, and a second condition wherein a constituent material is returned to said storage device, and said conduit means providing a flow path for a constituent material between said feeding means and said dispensing mechanism with said mechanism in said first condition which is substantially equal in flow resistance to a flow path for the same constituent material between said feeding means and said dispensing mechanism with said mechanism in said second condition.

2. Apparatus in accordance with claim 1 wherein; said dispensing mechanism further comprises, a first discharge valve and a first return valve for receiving one of said constituent materials from said storage device and a second discharge valve and a second return valve for receiving another of said constituent materials from said storage device, each of said discharge valves opening into said mixing chamber and each of said return valves opening into a portion of said conduit means having a flow path returning to said storage device, and wherein said conduit means further comprises a pair of first conduits one providing a flow path between said feeding means and said first discharge valve and another providing a flow path between said feeding means and said first return valve, and a pair of second conduits one providing a flow path between said second discharge valve and said feeding means and the other providing a flow path between said second return valve and said feeding means, the flow paths provided by said pair of first conduits being substantially equal in flow resistance one to the other and the flow paths provided by said pair of second conduits being substantially equal in flow resistance one to the other.

3. Apparatus in accordance with claim 2 which further comprises a control mechanism operative to open said first and second return valves and to simultaneously close said first and second discharge valves to move said dispensing mechanism from the first condition to the second condition thereof, and operative to open said first and second discharge valves and to simultaneously close said first and second return valves to move said dispensing mechanism from the second condition back to the first condition thereof.

4. Apparatus in accordance with claim 3 wherein said control mechanism is operated by fluid pressure.

5. Apparatus in accordance with claim 2 wherein said means for feeding constituent materials from said storage device to said dispensing mechanism comprises a first cylinder and piston operative to feed one of the constituent materials to said dispensing mechanism and a second cylinder and piston operative to feed another of the constituent materials to said dispensing mechanism, operating means for causing movement of each of said first and second pistons in said first and second cylinders to cause constituent material to flow to said dispensing mechanism, and adjustable correlating means interconnecting said operating means with said first and second pistons, said correlating means being readily adjustable for varying the ratio of constituent materials flowing to said dispensing mechanism.

6. Apparatus in accordance with claim 5 wherein said operating means has a member for causing movement of said first and second pistons in said first and second cylinders and said member is connected to said correlating means such that linear movement of said operating means member is effective to cause equal linear movement of said first piston, and is effective to cause linear movement of said second piston in a ratio to movement of said operating means member, which ratio is variable by adjustment of said correlating means.

7. Apparatus in accordance with claim 6 wherein said operating means is a fluid cylinder and piston arrangement and said operating means member is a piston rod interconnecting said operating piston with said correlating means.

8. Apparatus adapted for use in dispensing a composition provided by mixing together a plurality of constituent materials and comprising; a dispensing mechanism and means connected to said dispensing mechanism for feeding constituent materials to said dispensing mechanism, said means comprising a first cylinder and piston operative to feed one of the constituent materials to said dispensing mechanism and a second cylinder and piston operative to feed another of the constituent materials to said dispensing mechanism, operating means having a member for causing movement of each of said first and second pistons in said first and second cylinders, and adjustable correlating means interconnecting said operating means with said first and second pistons such that linear movement of said operating means member is effective to cause equal linear movement of said first piston and is effective to cause linear movement of said second piston in a ratio to movement of said operating means member which ratio is variable by adjustment of said correlating means.

9. Apparatus in accordance with claim 8 wherein said operating means is a fluid operated cylinder and piston arrangement and said operating means member is a piston rod interconnecting said operating piston with said correlating means.

10. Apparatus in accordance with claim 8 wherein said first cylinder bore is unequal to said second cylinder bore and wherein said correlating means is readily reversible with reference to said first and second cylinders such that in the reversed position linear movement of said operating means member is effective to cause equal linear movement of said second piston, and is effective to cause linear movement of first piston in a ratio to movement of said operating means member which ratio is variable by adjustment of said correlating means.

References Cited

UNITED STATES PATENTS

| 2,946,488 | 7/1960 | Kraft | 222—134 |
| 3,067,987 | 12/1962 | Ballou et al. | 259—7 |
| 3,216,622 | 11/1965 | Drostholm | 222—318 X |
| 3,306,495 | 2/1967 | Wabers | 222—318 X |

FOREIGN PATENTS

| 950,347 | 2/1964 | Great Britain. |
| 975,080 | 11/1964 | Great Britain. |

ROBERT B. REEVES, *Primary Examiner.*

H. S. LANE, *Assistant Examiner.*